US011215502B2

(12) United States Patent
Göhlich

(10) Patent No.: US 11,215,502 B2
(45) Date of Patent: Jan. 4, 2022

(54) DEVICE FOR SENSING MECHANICAL VIBRATIONS

(71) Applicant: Prüftechnik Dieter Busch GmbH, Ismaning (DE)

(72) Inventor: Horst Göhlich, Munich (DE)

(73) Assignee: Prüftechnik Dieter Busch GmbH, Ismaning (DE)

( * ) Notice: Subject to any disclaimer, the term of this patent is extended or adjusted under 35 U.S.C. 154(b) by 0 days.

(21) Appl. No.: 16/875,086

(22) Filed: May 15, 2020

(65) Prior Publication Data
US 2020/0363260 A1   Nov. 19, 2020

(30) Foreign Application Priority Data

May 16, 2019   (DE) .......................... 102019207168.6

(51) Int. Cl.
*G01H 11/08*   (2006.01)
(52) U.S. Cl.
CPC .................................... *G01H 11/08* (2013.01)
(58) Field of Classification Search
CPC ................................ G01H 11/08; G01H 1/00
See application file for complete search history.

(56) References Cited

U.S. PATENT DOCUMENTS

| 8,640,545 | B2 | 2/2014 | Zusman et al. | |
| 9,791,310 | B2 | 10/2017 | Girardeau | |
| 9,921,136 | B2 | 3/2018 | Wascat et al. | |
| 2009/0044628 | A1* | 2/2009 | Lotscher ................ | G01H 11/08 73/654 |
| 2016/0041070 | A1* | 2/2016 | Wascat ................... | G01M 7/00 702/183 |
| 2018/0071889 | A1 | 3/2018 | Huang et al. | |

FOREIGN PATENT DOCUMENTS

| DE | 10 2014 205 922 A1 | 10/2015 |
| JP | H03-10 162 A | 1/1991 |
| WO | 2011104433 A1 | 9/2011 |
| WO | 2014148657 A1 | 9/2014 |

OTHER PUBLICATIONS

German Search Report for DE 10 2019 207 168.6 dated Mar. 24, 2020.
European Search Report for EP Application No. 20174873.8 dated Oct. 15, 2020.

* cited by examiner

*Primary Examiner* — Herbert K Roberts
*Assistant Examiner* — John M Royston
(74) *Attorney, Agent, or Firm* — Millman IP Inc.

(57) ABSTRACT

A device for sensing mechanical vibrations of measurement objects that can be attached to measurement objects for this purpose comprises a housing, at least one vibration sensing element and at least two current sources. Here, the vibration sensing element and current sources are arranged inside housing, and current sources are arranged along at least one circle around the vibration sensing element, wherein identical angular distances are provided each time between adjacent current sources of the same circle. Based on this symmetric construction, the vibration behavior of the device is improved, which favorably affects the linear measurement behavior of the device.

10 Claims, 2 Drawing Sheets

DEVICE FOR SENSING MECHANICAL VIBRATIONS

Figure 1:
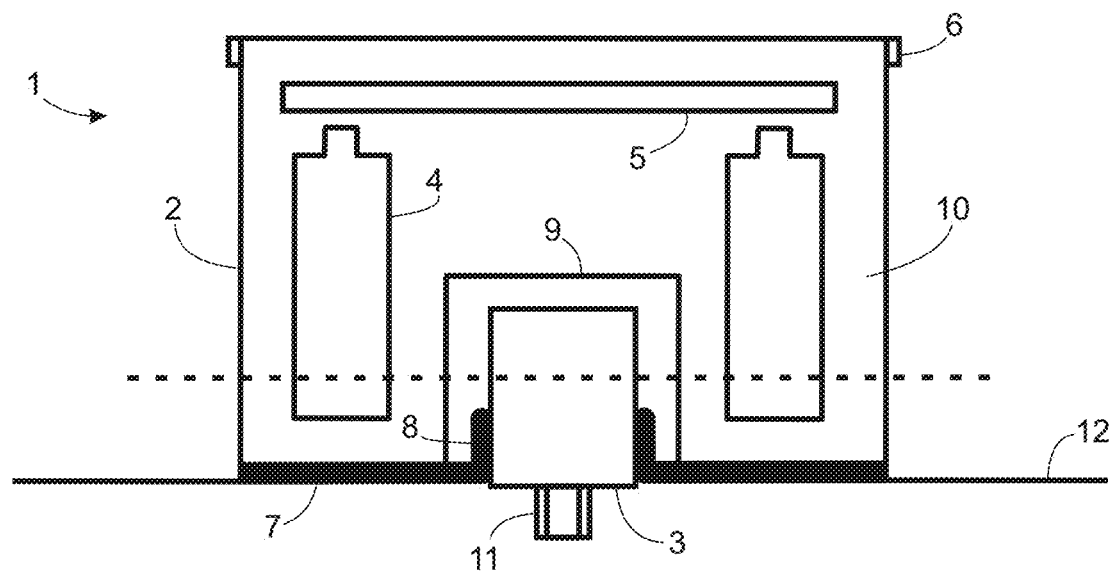

The present invention relates to a device for sensing mechanical vibrations of measurement objects and for this, the device can be attached to measurement objects, said device comprising a housing, at least one vibration sensing element, and current sources, wherein the vibration sensing element and the current sources are arranged inside the housing.

Such a device is known, for example, from U.S. Pat. No. 9,921,136 B2. In order to ensure a transmission of vibrations of the measurement object onto the vibration sensing element of the device that is as direct as possible, the vibration sensing element, is arranged in a lower part of the device, so that it is positioned as close as possible to the measurement object during the measurement. A battery provided as current source for the device is arranged directly above the vibration sensing element.

U.S. Pat. No. 8,640,545 B2 discloses another vibration sensing device. Also in this vibration sensing device, the vibration sensing element is arranged in a lower part of the device, whereas the current source is found directly above the vibration sensing element of the vibration sensing device.

Moreover, a vibration sensing device with a vibration sensing element and current sources is also known from U.S. Pat. No. 9,791,310 B2, wherein the current sources in the vibration sensing device are positioned at some distance above the vibration sensing element.

In contrast, DE 10 2014 205 922 A1 relates to a module having a fastening member for sensing the vibration behavior of a mechanical component. The module is designed such that it can be rigidly joined mechanically to the component in order to absorb mechanical vibration of the component.

For vibration sensors, oscillation sensors, or very generally in devices for sensing mechanical vibrations of measurement objects, it is usually desired that these devices are characterized by a sensing or measuring of mechanical vibrations that is as linear as possible, whereby an output signal generated as a function of sensed vibrations changes linearly with the amplitude or frequency of the sensed vibration. For such a linear measurement characteristic of the vibration or oscillation sensor or the device, the vibration behavior of the device or of the vibration or oscillation sensor should in turn be as non-disruptive as possible overall, and the vibration sensing element of the device or of the sensor should be arranged as close to the measurement object as possible. The vibration sensor or the vibration sensing element must also have a coupling to the measurement object that is as rigid as possible in order to be able to measure the vibration of the measurement object without disruptions. A low weight of the vibration sensing element provides that its intrinsic resonances lie outside the desired measurement range. For these reasons, devices for sensing mechanical vibrations of measurement objects have dimensions that are as small as possible and have a low weight. On the other hand, intelligent vibration sensors in the scope of the so-called Internet of Things (IoT) require an independent power supply, since they will be operated wirelessly as much as possible. The current sources necessary for this are, however, comparatively large and heavy, and for this reason, adversely affect the intrinsic vibration behavior of the device.

The object of the present invention is to create a device for sensing mechanical vibrations of measurement objects, said device comprising an independent power supply, whose vibration behavior is improved in comparison to known devices.

The object is achieved by the device having the features of claim 1. Preferred examples of embodiment are the subject of the dependent claims.

According to the present invention, the device has at least two current sources that are arranged along at least one circle around the vibration sensing element, wherein identical angular distances are provided each time between adjacent current sources of the same circle. In other words, the current sources arranged along a circle are distributed uniformly or symmetrically around the vibration sensing element, whereby the vibration sensing element is positioned at the central point of the circle on which the current sources are arranged. In the case of current sources that are arranged along several circles around the vibration sensing element, the circles are concentric to one another and the vibration sensing element is found at their common central point. On this basis, in the device according to the invention, the vibration sensing element and the current sources are positioned along a longitudinal axis of the device, essentially at the same height or at comparable heights. In other words, in the direction of the normal line to the longitudinal axis of the device or to a longitudinal axis of the vibration sensing element, each of the current sources overlaps at least partially or in sections with the vibration sensing element. The overlapping sections usually involve the end sections of each current source facing the measurement object during the vibration measurement, as well as an end section of the vibration sensing element facing away from the measurement object during the vibration measurement. After attaching the device to a measurement object, surfaces of the current sources facing the measurement object are distanced less far from the measurement object than a surface of the vibration sensing element facing away from the measurement object. In particular, a configuration of the device is possible, in which, after attaching the device to a measurement object, surfaces of the current sources facing the measurement object and a surface of the vibration sensing element facing the measurement object are distanced equally far from the measurement object, or in which, the above-named surfaces of the current sources and of the vibration sensing element are flush with one another in the direction of the normal line to the longitudinal axis of the device.

In this case, the device can also absolutely have more than two current sources, for example, three, four, five, six, or even more current sources, as long as the latter are distributed symmetrically around the vibration sensing element. Preferably, the current sources are of elongated shape or they have particular longitudinal axes that are aligned parallel to the longitudinal axis or central axes of the device.

Unlike in known devices for oscillation or vibration measurement, the specific symmetrical arrangement of the current sources around the vibration sensing element for the device according to the invention provides that the center of gravity of the current sources that are mostly relatively heavy and large in comparison to the vibration sensing element is not displaced away from the vibration sensing element, but rather, on the contrary is moved closer to it. This movement of the center of gravity of the current sources influencing the volume and the weight of the entire device toward the vibration sensing element leads to a clear improvement of the desired vibration behavior of the device. In particular, due to this arrangement, tipping vibrations of the relatively tall housing that frequently occur in known vibration sensors and that are also sensed by the vibration sensing element, thus falsifying the measurement result supplied by the vibration sensor, are reduced. In addition, various transverse and longitudinal intrinsic characteristic modes that are stimulated by vibrations of the measurement object, which is a machine for the most part in practice, and that lead to a nonlinear measurement behavior of the device are suppressed in the device according to the invention. One of these characteristic frequencies can be caused, for example, by the liquid electrolyte of the current sources, since current sources such as batteries, for example, are not completely filled with electrolyte, and the liquid electrolyte swings back and forth in the housing of the current source. As a consequence of the improved vibration behavior of the device according to the invention based on its symmetric construction, the frequency linearity of the device is thus greatly improved. In summary, the device of the present invention is thus characterized by a symmetric construction that acts favorably on the vibration behavior of the device, and which thus also promotes the linear measurement behavior of the device itself, if the device is dimensioned very small and lightweight.

Usually the current sources and all other parts of the device that must be mechanically decoupled from the vibration sensing element, such as circuit boards, for example, or the housing, are not in mechanical contact with the vibration sensing element and are distanced from the latter, so that vibrations of the current sources that falsify measurements cannot be directly transmitted to the vibration sensing element. For fully similar reasons, in an advantageous embodiment of the invention, the current sources and the housing are free of contact with one another, i.e., the current sources and the housing are not in contact with one another or the current sources and the housing do not touch each other at any place. Due to the contact-free or non-touching arrangement of current sources and housing, which in the final analysis means a spatial separation or distancing of the current sources from the housing, a transmission of the above-described vibrations of the current sources to the housing and beyond it to the vibration sensing element can be reduced.

Preferably, the device has at least one damping unit for damping vibrations of the current sources. This damping unit can be, for example, a foam material with which the current sources are sheathed or into which the current sources are inserted. Current sources that are sheathed by such foam material or inserted into such foam material are kept from touching the housing or from coming into contact with the housing at any place. Correspondingly, with the exception of the vibration sensing element, vibrations of all other parts of the device that are also arranged inside the housing, such as circuit boards, for example, are damped by means of such foam material, and a contact of these parts with the housing can be prevented with such a foam material unit. In this way, the damping unit can nearly completely or completely fill the space on the inside of the housing around the parts arranged therein.

Advantageously, the housing has a contact surface by which the device can be applied to surfaces of measurement objects. This contact surface can be planar or convex. Most generally, the contact surface can be designed corresponding to the shape of the surface of the measurement object to which the device shall be applied in order to make possible an attachment of the device to the measurement object that is as secure and flat as possible.

Particularly advantageously, devices with such a contact surface have at least one damping element, wherein at least one part of the contact surface is formed by a surface of the damping element. It is most particularly advantageous when the entire contact surface is formed by the surface of the damping element. In such cases, the housing exclusively comes into contact with the measurement object via the damping element. For example, the damping element may be a rubber membrane. Not only can the transmission of vibrations to the housing be prevented with such a damping element. Housing vibrations that are transmitted via the detour of stimulating vibrations of the measurement object to the vibration sensing element can also be prevented.

Advantageously, the vibration sensing element can be joined to measurement objects and, in particular, can be joined detachably to measurement objects. For this purpose, the vibration sensing element can be provided with a thread, which permits a detachable joining of the vibration sensing element to the measurement object at a site provided for this. A vibration sensing element joined to the measurement object is not only arranged as close as possible to the measurement object, but it is also in direct contact therewith and is solidly coupled to the measurement object. The transmission of vibrations of the measurement object to the vibration sensing element in such cases is direct and is particularly favorable and undisturbed. Further, the vibration sensing element can be joined to measurement objects by means of adhesives and/or by means of one or more magnets.

In a preferred embodiment of the device, at least one damping means is provided, which is applied to the vibration sensing element. Therefore, the damping means can be arranged between the vibration sensing element and the housing. Due to the damping means, the direct transmission of housing vibrations to the vibration sensing element is reduced or even prevented. As in the case of the above-named damping element, the damping means may also involve a rubber membrane. In particular, one and the same rubber membrane can be provided for the damping element and for damping means, wherein a first section of the rubber membrane fulfills the function of the damping means and a second section fulfills the function of the damping element. Also, this first section can be designed for holding the vibration sensing element in the housing.

Preferably, at least one of the current sources is rechargeable and/or a battery and/or a lithium battery. Rechargeable current sources such as storage batteries, for example, are characterized by their rechargeability, while batteries, and particularly lithium batteries, have a longer service life and provide more energy than storage batteries. Therefore, all current sources of the device can basically be of different types. Of course, it is more favorable for operation of the device when all current sources of the device are of the same type. For example, all current sources of the device can be batteries or lithium batteries, or all current sources of the device can be storage batteries.

Basically, the vibration sensing element may be any vibration sensing element. Thus, the vibration sensing element may involve a piezo element and/or a MEMS vibration absorber (MEMS: Micro-Electro-Mechanical System).

Moreover, the device advantageously has at least one data transmission interface and/or at least one data storage unit and/or at least one control unit and/or at least one signal processing unit and/or at least one sensor. The data transmission interface may be an interface for wired or for wireless transmission of data, for example, of measurement data that have been sensed by the device. Also, data such as control data, for example, can be received by the device via the data transmission interface. A data storage unit can be of advantage for temporary storing of measurement data or of received data. If, in contrast, the device has a control unit, then functions of the device can be at least partially controlled autonomously by the device itself and are free of outside influence or externally received control data. Vibrations sensed by the vibration sensing element or vibrations or vibration signals already in the device itself can be processed or at least pre-processed by means of a signal processing unit. Insofar as the device also has a sensor, additional physical quantities such as temperature, for example, can be sensed or measured with it.

Figure 2:
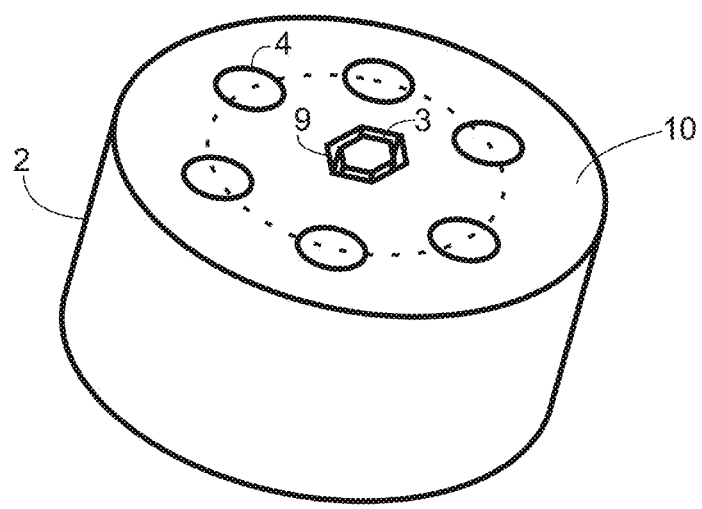
Figure 3:
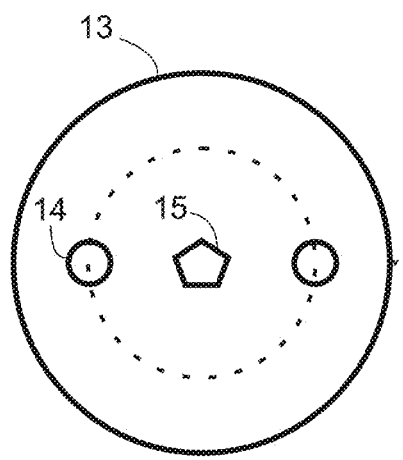
Figure 4:
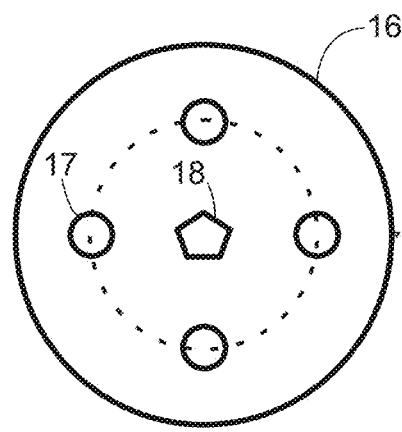
Figure 5:
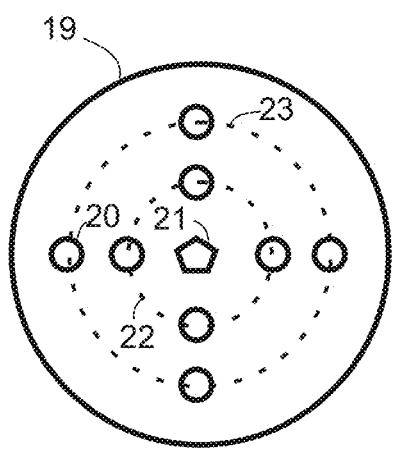
Figure 6:
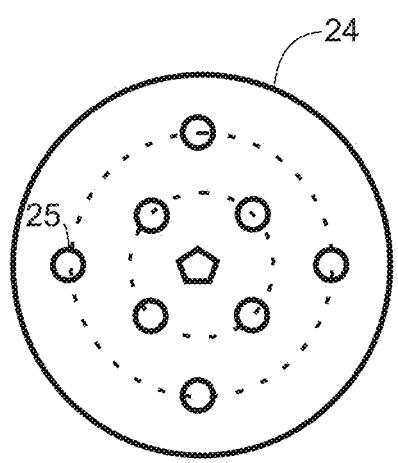

The invention will be described in more detail below, based on preferred examples of embodiment and with the help of figures. Shown herein:

FIG. 1 a cross section through a device for sensing mechanical vibrations of measurement objects;

FIG. 2 a section through the device of FIG. 1 along the broken line shown in FIG. 1;

FIG. 3 a device for sensing mechanical vibrations of measurement objects having two current sources;

FIG. 4 a device for sensing mechanical vibrations of measurement objects having four current sources;

FIG. 5 a device having current sources arranged along two circles;

FIG. 6 another device having current sources arranged along two circles.

A device for sensing mechanical vibrations or a vibration sensor 1 can be seen in cross section in FIG. 1. For reasons of clarity, the vibration sensor 1 is shown schematically and not true to scale.

The vibration sensor 1 comprises a housing 2, a vibration sensing element 3, a total of six current sources 4, and a printed circuit board 5. Various electronic components, which are not shown in detail in FIG. 1, and which the vibration sensor 1 requires for its operation, such as, for example, a control unit, a data storage unit, or a data transmission interface, can be arranged on the printed circuit board.

The housing 2 is essentially of hollow cylindrical shape. One side of housing 2 is sealed by a cover 6. In contrast, the side of housing 2 facing away from cover 6 is spanned by a rubber membrane 7. An outer surface of the rubber membrane 7 is thus provided as a contact surface of housing 2, by which housing 2 and thus the vibration sensor 1 can be applied or attached as such to surfaces of measurement objects.

The rubber membrane 7 has in its center an opening within which the vibration sensing element 3 is arranged extending into the inside of housing 2. An edge section 8 of the rubber membrane 7 surrounding the opening is thereby inverted into the inside of housing 2 and extensively applied to the vibration sensing element 3.

The current sources 4 as well as the printed circuit board 5 are also found inside housing 2. With the exception of a recess 9, inside which are arranged the vibration sensing element 3 and the edge section 8, the interior space of housing 2 is completely filled with a foam material 10.

Outside the interior space, a threaded section 11 is formed on the vibration sensing element 3.

For the measurement of oscillations or vibrations of a measurement object with the vibration sensor 1, this sensor is attached to the particular measurement object. In FIG. 1, for the measurement of oscillations or vibrations of a machine 12 as a measurement object, the vibration sensor 1 is attached to the measurement object, whereby the threaded section 11 is screwed into the machine 12 at a place provided for this or is screwed together with machine 12. Both the vibration sensing element 3 as well as the outer surface of rubber membrane 7, which forms the contact surface of housing 2, enter into direct contact thereby with a surface of machine 12. In order to prevent a lifting off of housing 2 from the surface of machine 12, a solid joining of housing 2 with machine 12 is advantageous. For this purpose, the vibration sensor 1 can provide magnets, or a gluing or adhesive bonding can be formed between the contact surface of housing 2 and machine 12. After successful measurement of oscillations or vibrations of machine 12, the vibration sensor 1 can be unscrewed again from machine 12 and be removed therefrom.

Due to the direct contact of the vibration sensing element 3 with machine 12 during the measurement as well as the solid or rigid joining to or connecting to machine 12, oscillations and vibrations of machine 12 are transmitted directly to the vibration sensing element 3 and can be sensed or measured by the latter. The transmission of oscillations and vibrations of machine 12 to housing 2 in fact is damped by rubber membrane 7, by which housing 2 is coupled only slightly or weakly to machine 12 and to the vibration sensing element 3. Of course, a transmission of vibrations to housing 2 cannot usually be completely prevented, however. A damping of vibrations transmitted to housing 2 is produced by foam material 10, which fills the interior space of housing 2. All inner-lying hard parts of the vibration sensor 1 such as current sources 4 and printed circuit board 5 are mechanically strongly decoupled from housing 2 and machine 12 by this foam material.

Despite rubber membrane 7 and foam material 10, a last residue of machine vibrations penetrates current sources 4 and stimulates them to vibrate. Since current sources have larger dimensions and also a greater mass in comparison to the vibration sensing element 3 and wherever possible are filled with a liquid electrolyte that sloshes back and forth inside current sources 4, the vibrations of current sources 4 can unfavorably affect the measurement of the vibration sensing element 3. In the vibration sensor 1 shown in FIG. 1, the damaging effect of the vibrations of current sources 4 is, of course, effectively prevented due to the specific arrangement of current sources 4 inside housing 2 and relative to the vibration sensing element 3.

As can be seen in FIG. 2, which shows a section through vibration sensor 1 along the broken line depicted in FIG. 1, the six current sources 4 of the vibration sensor 1 are arranged along a broken circle in FIG. 2 at identical angular distances around the vibration sensing element 3. This uniform or symmetrical distribution of current sources 4 around the vibration sensing element 3 particularly provides that current sources 4 are not positioned above the vibration sensing element 3, but are found inside housing 2 essentially at a height comparable or identical to the vibration sensing element 3. The latter positioning can be seen in FIG. 1, in that a lower end section of each current source 4 facing the machine 12 overlaps or is flush with an upper end section of the vibration sensing element 3 facing away from machine 12 in the direction of the normal line to the longitudinal axis of the vibration sensor 1 or the vibration sensing element 3. Consequently, current sources 4 are arranged relatively deep inside housing 2, so that that they are relatively close to machine 12 or to another measurement object of machine 12 or to the measurement object when the vibration sensor 1 is applied. Thus, the center of gravity of current sources 4 is also found relatively deep inside housing 2 and relatively close to machine 12 or the measurement object. Further, due to the arrangement of current sources 4 around the vibration sensing element 3, the height of housing 2 is lower than in known vibration sensors, so that lower vibration amplitudes of housing 2 can be stimulated and tipping vibrations of housing 2 act less strongly. Hence, by the symmetrical arrangement of current sources 4 or other components around the vibration sensing element 3 and the deep positioning of their centers of gravity inside housing 2 caused thereby, effects of diverse transverse and longitudinal intrinsic modes of current sources 4 as well as tipping vibrations of housing 2 on the measurement behavior of the vibration sensing element 3 are effectively prevented.

As long as the arrangement of current sources 4 around the vibration sensing element 3 is symmetrical or uniform, the above-described advantageous effects are also established in vibration sensors that have more than six current sources 4 or that have less than six, but at least two current sources 4. Thus, it does not matter whether there is an odd or even number of current sources 4.

FIG. 3 shows, for example, a section through a vibration sensor 13 having only two current sources 14 and a vibration sensing element 15 arranged centrally. The two current sources 14, on the one hand, are arranged on both sides of the vibration sensing element 15 along a straight line with the latter. At the same time, current sources 14, however, are also distributed uniformly at the same angular distance, which amounts to 180°, along the broken circle depicted in FIG. 3

In contrast, seen in FIG. 4 is a cross section through a vibration sensor 16 having four current sources 17 and a central vibration sensing element 18. Also in the case of vibration sensor 16, the four current sources 17 are distributed around the central vibration sensing element 18 along a broken circle depicted in FIG. 4. However, the angular distance between current sources 17 now amounts to 90°.

Based on the above-described examples it is not difficult to recognize how very generally, the angular distance in the case of n current sources symmetrically or uniformly distributed along a circle around a vibration sensing element amounts to 360°/n, wherein n is a whole number that is equal to or greater than 2. Here, it does not matter whether n is an odd or even number.

A vibration sensor 19 having a total of eight current sources 20, which are arranged around a central vibration sensing element 21, is shown in FIG. 5. Here, of course, four current sources having identical angular distances are arranged along an inner circle 22, while the remaining four current sources having identical angular distances are arranged along an outer circle 23 around the central vibration sensing element 21. The two circles 22 and 23 are concentric to one another and the current sources 20 of the circles are positioned along two lines orthogonal to one another.

In contrast, a vibration sensor 24 having eight current sources 25 that are not positioned along two lines orthogonal to one another can be seen in FIG. 6.

Moreover, current sources of vibration sensors can also be arranged along more than only two circles. It is likewise possible that the number of current sources arranged along a circle is different from circle to circle. For example, four current sources can be distributed along an inner circle and five or six current sources can be distributed along an outer circle.

LIST OF REFERENCE NUMBERS

1 Vibration sensor
2 Housing
3 Vibration sensing element
4 Current source
5 Printed circuit board
6 Cover
7 Rubber membrane
8 Edge section
9 Recess
10 Foam material
11 Threaded segment
12 Machine
13 Vibration sensor
14 Current source
15 Vibration sensing element
16 Vibration sensor
17 Current source
18 Vibration sensing element
19 Vibration sensor
20 Current source
21 Vibration sensing element
22 Inner circle
23 Outer circle
24 Vibration sensor
25 Current source

The invention claimed is:

1. A device for sensing mechanical vibrations of measurement objects that is attachable to measurement objects for this purpose, comprising:
   a housing,
   at least one vibration sensing element and
   at least two current sources, wherein
   the vibration sensing element and the current sources are arranged inside the housing and
   the current sources are arranged along at least one circle around the vibration sensing element, and wherein
   the current sources are positioned with identical angular distances between adjacent current sources of the same circle.

2. The device according to claim 1, in which the current sources and housing are free of contact with one another.

3. The device according to claim 1, having at least one damping unit for damping vibrations of the at least two current sources.

4. The device according to claim 1, in which the housing has a contact surface, by which the device can be applied to surfaces of measurement objects.

5. The device according to claim 4, having at least one damping element, wherein at least one part of the contact surface is formed by a surface of the damping element.

6. The device according to claim 1, in which the vibration sensing element can be joined to measurement objects.

7. The device according to claim 1, having at least one damping means that is applied to the vibration sensing element.

8. The device according to claim 1, in which at least one of the current sources is at least one of rechargeable, a battery, and a lithium battery.

9. The device according to claim 1, in which the vibration sensing element comprises at least one of (a) at least one piezo element, and (b) at least one MEMS vibration absorber.

10. The device according to claim 1, having at least one of (a) at least one data transmission interface, (b) at least one data storage unit, (c) at least one control unit, (d) at least one signal processing unit, and (e) at least one sensor.

* * * * *